United States Patent [19]
Fletcher et al.

[11] 3,882,732
[45] May 13, 1975

[54] MATERIAL SUSPENSION WITHIN AN ACOUSTICALLY EXCITED RESONANT CHAMBER

[76] Inventors: James C. Fletcher, Administrator of the National Aeronautics and Space Administration with respect to an invention of; Taylor G. Wang, Glendale, Calif.; Melvin M. Saffren, Altadena, Calif.; Daniel D. Elleman, La Canada, Calif.

[22] Filed: Aug. 31, 1973

[21] Appl. No.: 393,523

[52] U.S. Cl. ................................................. 73/505
[51] Int. Cl. ...................... G01c 19/16; G01c 1/00
[58] Field of Search .......... 73/505; 74/5; 75/65 ZM; 148/1.6; 259/DIG. 44, DIG. 46; 269/20; 308/10; 219/7.5

[56] References Cited
UNITED STATES PATENTS

| | | | |
|---|---|---|---|
| 2,686,865 | 8/1954 | Kelly | 308/10 X |
| 2,998,335 | 8/1961 | Dehmelt | 148/1.6 |
| 3,065,062 | 11/1962 | Enk et al. | 75/65 ZM X |
| 3,164,022 | 1/1965 | Ensley | 73/505 |
| 3,232,120 | 2/1966 | Ensley | 73/505 |

*Primary Examiner*—James J. Gill
*Attorney, Agent, or Firm*—Monte F. Mott; Paul F. McCaul; John R. Manning

[57] ABSTRACT

A method for positioning an object within a chamber, which is especially useful in performing manufacturing operations under zero gravity conditions, including applying sound waves within the chamber in different directions and at a frequency for each direction that establishes a standing wave pattern so that the object is automatically urged towards the intersections of the nodes, or locations of minimum pressure.

11 Claims, 18 Drawing Figures

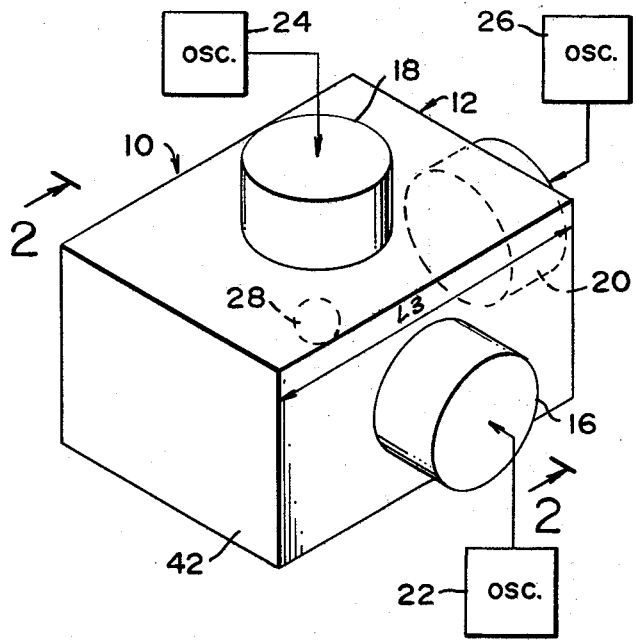
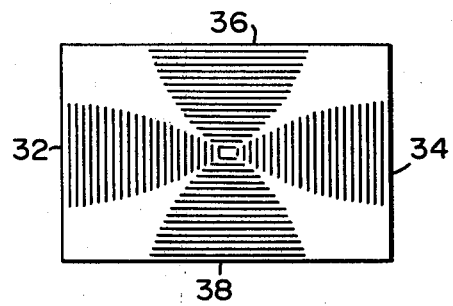
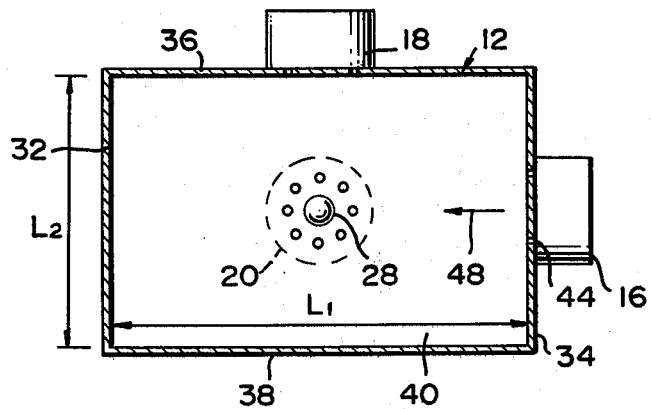
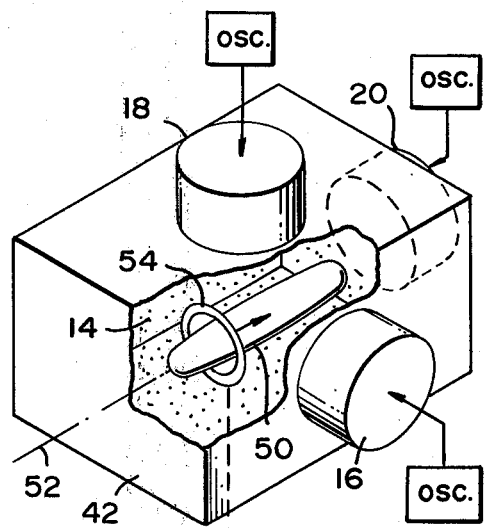
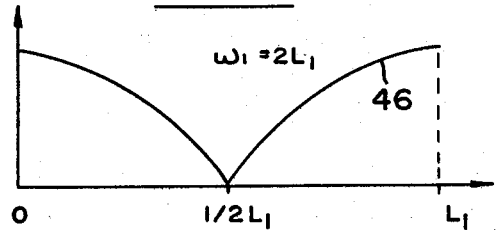
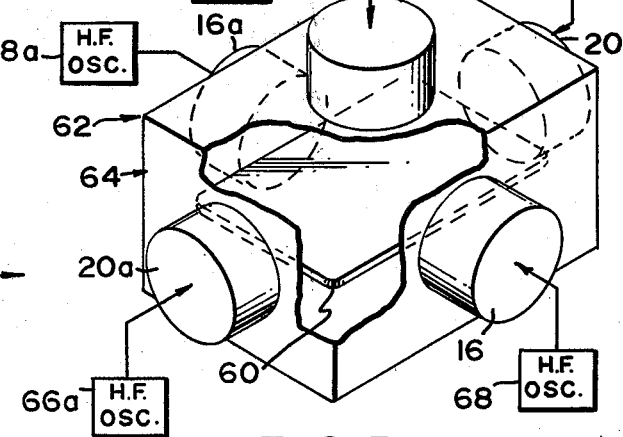

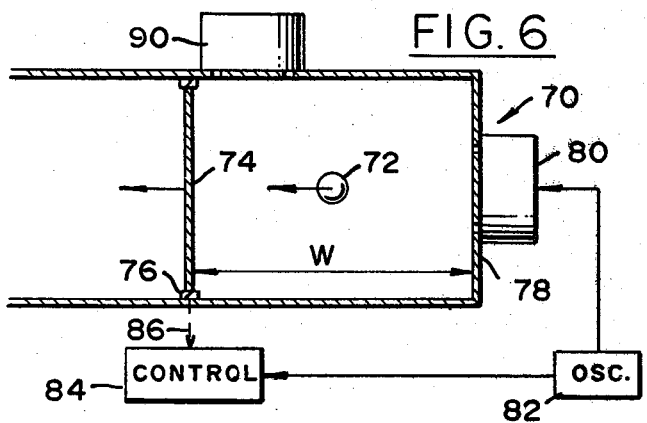
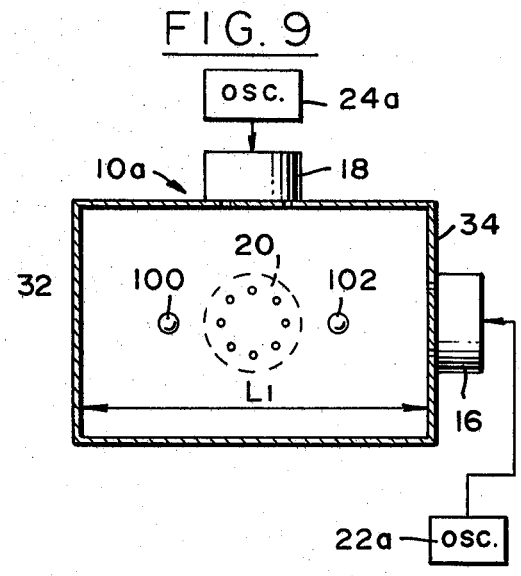
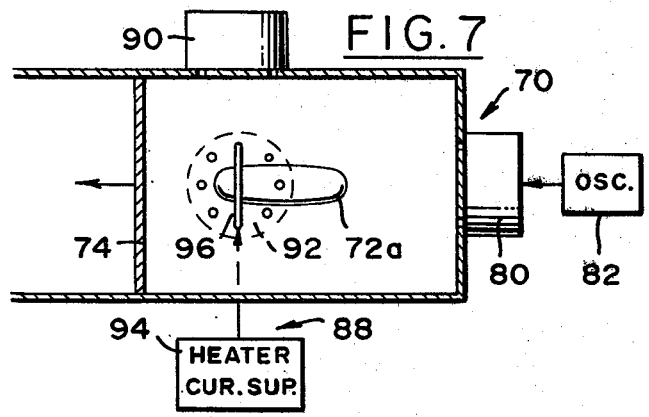
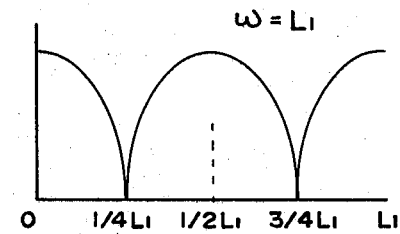
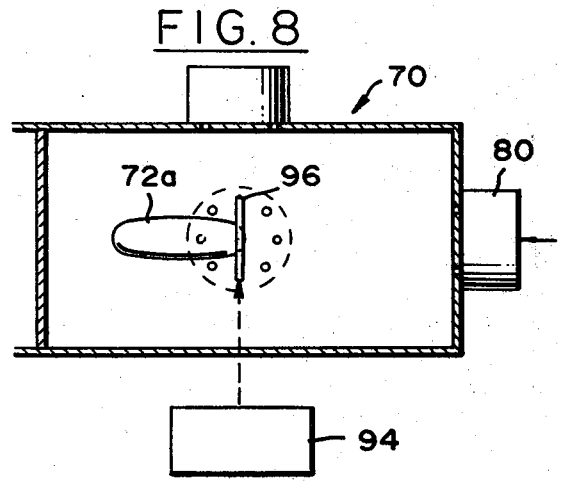
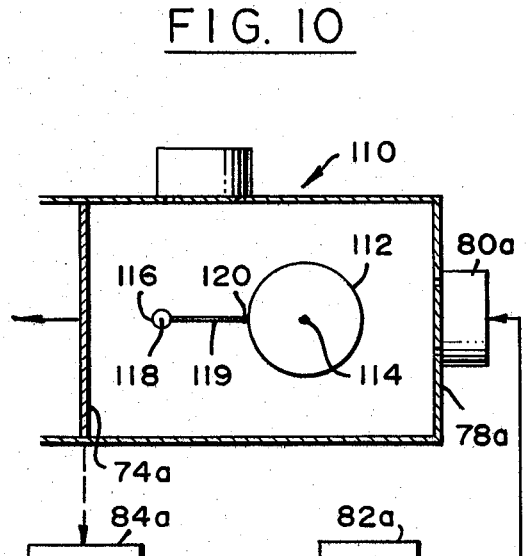
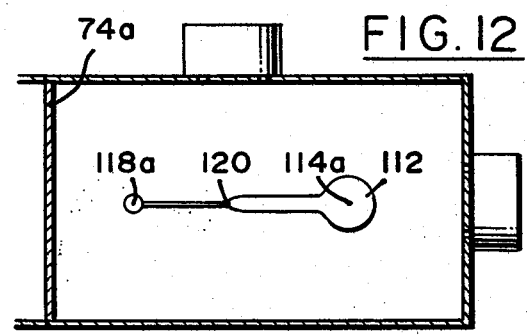

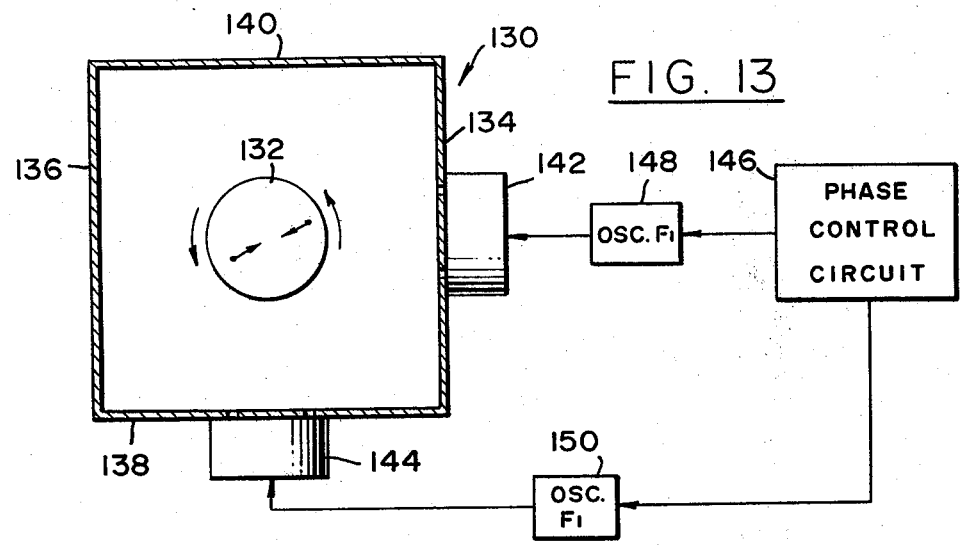
FIG. 13
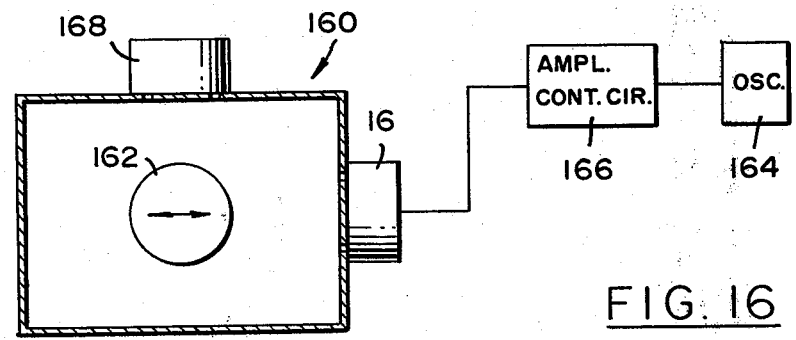
FIG. 14
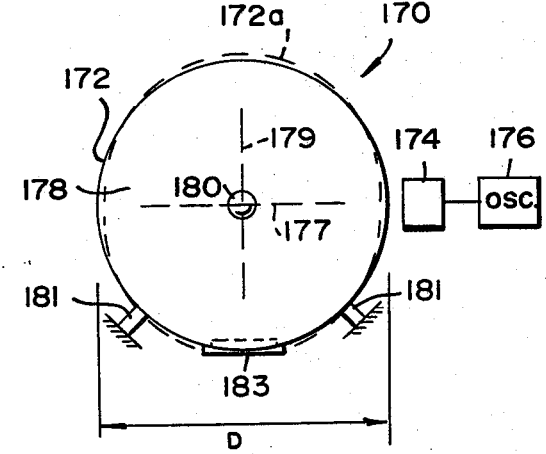
FIG. 15
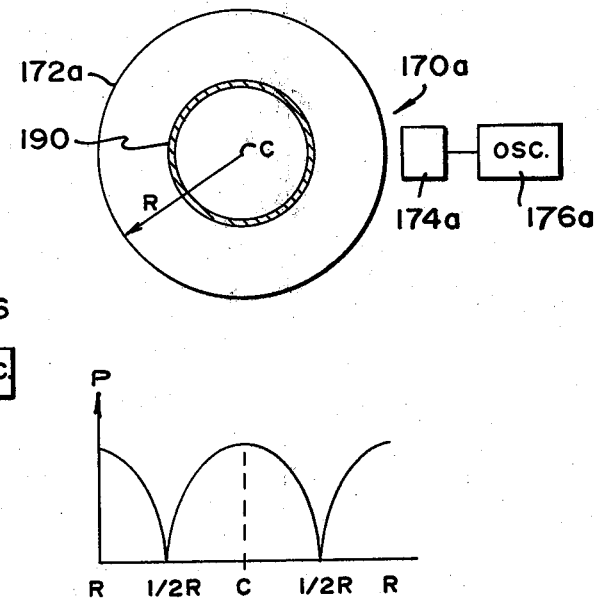
FIG. 16
FIG. 17

3,882,732

1

MATERIAL SUSPENSION WITHIN AN ACOUSTICALLY EXCITED RESONANT CHAMBER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U. S. C. 2457).

BACKGROUND OF THE INVENTION

This invention relates to apparatus and methods for suspending and positioning objects by the use of acoustic energy.

Many manufacturing and other operations can be more readily accomplished under zero gravity conditions than on the earth's surface. One of the major advantages of a zero gravity environment is that objects can be maintained free of contact with solid supports. Thus, for example, a molten object can be maintained in an extremely pure state by keeping it away from the walls of a furnace. Although a nominally zero gravity environment can eliminate the need for large supports, there is still a need for means to apply small forces to an object, to position it and to prevent drift under the small residual acceleration forces that typically exist in a spaceship environment.

SUMMARY OF THE INVENTION

In accordance with one embodiment of the present invention, an apparatus is provided which permits close control of the position of an object while permitting manufacturing operations to be performed on the object. The apparatus includes a chamber of rectangular or parallelepiped form and three transducers for applying sound waves to the atmosphere within the chamber. Each of the three transducers can be driven at a frequency which produces a standing wave pattern within the chamber, with a node halfway between the opposite walls. As a result, an object is urged towards the center of the chamber, and therefore is suspended at a distance from all of the chamber walls. Heating apparatus can be utilized to heat the object so it is maintained in a molten state and is uncontaminated by the chamber walls.

The provision of a chamber of rectangular cross-section and a plurality of independently driveable transducers provides great versatility in positioning. A molten object can be established in an elongated and largely cylindrical shape by energizing only two of the three transducers at a high level, so that the liquid mass is subjected to a high pressure all around its axis to urge it to elongate along the direction of nearly zero pressure gradient. A liquid mass can be formed into a thin or sheet-like form, by highly energizing only one of the transducers. An object in the chamber can be gradually moved by making one of the chamber walls moveable and by varying the frequency of the opposite transducer to remain resonant with the varying chamber dimension. One of the three transducers can be driven at a frequency that establishes two node locations within the chamber, so that two objects can be kept apart at controlled positions within the chamber. An object in a chamber of square cross-section can be made to rotate by operating the transducers at slightly different frequencies.

2

A simple spherical chamber can be utilized, in which a standing wave pattern is established by vibrating the walls of the spherical chamber at a frequency that establishes a node at the center of the chamber.

The novel features of the invention are set forth with particularity in the appended claims. The invention will best be understood from the following description when read in conjunction with the accompanying drawings.

BRIEF DESCRIPTION OF THE DRAWINGS

FIG. 1 is a simplified perspective view of an acoustic positioning device constructed in accordance with the present invention;

FIG. 2 is a sectional view taken on the line 2—2 of FIG. 1;

FIG. 3 is a graph showing the pressure distribution in one direction along the chamber of FIG. 1, when a corresponding transducer is driven at a lowest resonant frequency;

FIG. 3A is a view similar to FIG. 2, but with a representation of standing wave patterns created by the transducers;

FIG. 4 illustrates a method for forming a largely cylindrical liquid body within the chamber of FIG. 1;

FIG. 5 illustrates a method for forming a largely sheet-shaped liquid body in the chamber of FIG. 1;

FIG. 6 illustrates an acoustic positioning system which includes a chamber with a moveable wall to permit controlled movement of an object therein;

FIG. 7 illustrates the chamber of FIG. 6 utilized for zone purification of a mass;;

FIG. 8 is an illustration of the apparatus of FIG. 7, shown at a later stage of the zone purification method;

FIG. 9 illustrates a method utilizing the apparatus of FIG. 1 to position two objects at spaced locations within the chamber;

FIG. 10 is a graph illustrating the variation of pressure with position along one axis of the apparatus of FIG. 9;

FIG. 11 illustrates a method utilizing the apparatus of FIG. 9 to grow a crystal;

FIG. 12 illustrates the method of FIG. 11 at a later stage of the crystal-growing operation;

FIG. 13 illustrates a positioning system and method for rotating a suspended object;

FIG. 14 is an illustration of an apparatus utilized to mix a liquid object in the chamber;

FIG. 15 is a side elevation view of a spherical chamber apparatus, showing how a standing wave pattern is established therein;

FIG. 16 is a sectional side view of the apparatus of FIG. 15, showing how the apparatus can be operated to form a hollow sphere therein; and FIG. 17 is a graph showing the variation of pressure across the diameter of the spherical chamber of FIG. 16.

DESCRIPTION OF THE PREFERRED EMBODIMENTS

FIGS. 1 and 2 illustrate a positioning system 10 which includes an enclosure or chamber 12 of parallelepiped shape and having rectangular cross-sections. The inside of the chamber 12 is filled with a fluid 14, and normally a gaseous fluid such as helium. Three transducers 16, 18, and 20 are positioned adjacent to three mutually orthogonal walls of the chamber, to produce acoustic waves in the chamber which can be controlled in three dimensions. The transducers are driven by three oscillators 22, 24, and 26. The apparatus is designed to position an object or mass 28 within the chamber without requiring support from a solid object.

The apparatus 10 is especially useful to control the position of an object under nominally zero gravity conditions such as may exist in a space vehicle. The force levels which can be readily obtained with conventional sonic transducers is relatively low, so that under conditions of ordinary earth gravity only low density objects such as those constructed of foam material can be readily suspended by the positioning apparatus. However, force levels are high enough to maintain the positions of very dense objects in common spacecraft environments, where the residual gravitational force can be readily maintained at less than $10^{-4}{}_g$. The positioning apparatus 10 can be utilized to position an object and maintain its position or slowly move it under such zero gravity conditions. This permits a variety of manipulations to be carried out, including many manufacturing processes that cannot be readily carried out on the earth. A description of several of such manufacturing processes will be given below.

The chamber 12 is provided with three pairs of walls including the pair 32, 34, the pair 36, 38, and the pair 40, 42. Each transducer lies adjacent to one wall of a pair, and each of these walls has holes 44 to facilitate the transmission of sonic energy from the transducer to the inside of the chamber. The transducers control the position of the object by establishing a standing wave pattern within the chamber, so that at least one node location of minimum pressure is established. The object tends to move to the node and to remain thereat, because any deviation from the node increases the pressure on one side of the object that urges the object back towards the node.

FIG. 3 illustrates the pressure distribution across the width of the chamber 12 between the walls 32, 34 which are separated by the distance $L_1$. The graph 46 shows the pressure distribution when the transducer 16 is driven at the lowest resonant frequency for the chamber width $L_1$, which is the frequency at which the wave length equals twice the width dimension. At this frequency, only one node is produced, and this pressure node, or point of lowest pressure, lies halfway between the opposite walls across which the acoustic energy is transmitted, or in other words, at the position one-half $L_1$. It can be appreciated that an object tends to remain at this node location, since any deviation results in an increased pressure at the side of the object furthest from the node and in a decreased pressure on the side of the object closest to the node, the pressure differential producing a net force urging the object back towards the node. Also, an object introduced into the chamber at any point will move toward the node and thereafter remain thereat. FIG. 3A illustrates the standing wave patterns in two orthogonal directions.

In the chamber 12 of rectangular cross section, the standing wave pattern generated by one transducer such as 16 will often have no appreciable node in directions perpendicular to the direction of arrow 48 in which the transducer initially transmits sonic energy. Thus, the object could still drift in directions perpendicular to the arrow 48. Positioning in directions perpendicular to arrow 48 is accomplished by the two other transducers 18 and 20 which are driven at frequencies to establish standing wave patterns in corresponding directions across the chamber. When three orthogonal standing wave patterns are established, which each produce a node halfway across the chamber, the object is held against movement in any direction away from the center of the chamber. It should be understood that the chamber does not have to be rectangular in all cross sections, although it is desirable that opposite pairs of walls be approximately parallel to facilitate the maintenance of the standing wave pattern.

It is generally desirable that the three orthogonal dimensions of the chamber be different, that is, that the separation $L_2$ between the wall 36, 38 be different from $L_1$, and the separation $L_3$ between the wall pair 40, 42 be different from $L_1$ and $L_2$. This difference is desirable to eliminate interaction of the orthogonal wave patterns, which might necessitate control of the relative phases of the different transducers so as to maintain a constant wave pattern intensity in all directions. A difference in dimensions of at least ten percent is generally sufficient to prevent any resonant wave pattern in one direction from interfering with a pattern in another direction.

The apparatus of FIG. 1 can be utilized in a variety of manufacturing applications where it is desirable to suspend an object. One application is the melting of material without contamination from furnace walls. Two materials which are to be mixed together, such as two metals which are to be alloyed, can be introduced into the chamber 12, and positioning in the middle of the chamber by the three transducers. Heat that can be applied, as by ordinary induction heating or by the application of heating radiation, until the materials achieve a liquid state. A surrounding fluid 14 of inert gas such as helium, can be utilized to prevent contamination. When the liquid cools, it will have a spherical shape.

FIG. 4 illustrates how the apparatus 10 can be utilized to form a liquid object or mass 50 into an elongated, largely cylindrical, shape. This is accomplished by driving two of the transducers 16, 18 at a high energy level while driving the other transducer 20 at a much lower level. By driving the two transducers 16, 18 at a high energy level, large pressures are applied to the surface of the mass 50 in all directions except along the direction of the axis 52. Although surface tension of the liquid mass 50 tends to form it into a sphere, the acoustic pressure produces an elongation so that the mass forms a largely cylindrical shape. The third transducer 20, which delivers acoustic energy along the axis 52, is operated at a very low level, so that it produces only a small pressure to permit elongation of the mass. The transducer 20 is utilized to produce a small force sufficient to prevent drift of the mass against the ends or end walls 40, 42 of the chamber, and the transducer can be completely deactivated under very low residual gravity conditions.

The generation of an elongated shape, as in FIG. 4, is useful in a variety of manufacturing applications. One operation is the zone purification of material, which is commonly utilized to create ultra pure materials used in transistors and other solid state electronic devices. Zone purification is accomplished in the apparatus of FIG. 4 by providing a heating coil 54 connected to a current source (not shown) and which is slowly moved by a linear motor 56. The motor 56 moves the coil 54 along the length of the elongated mass 50 while the coil closely surrounds, but does not touch, the mass. The mass is maintained at an average temperature slightly below its melting point. As the coil moves along the mass, it melts a small zone near the coil while allowing a previous zone to solidify, to drag the impurities towards one end of the mass. While this purification technique is well known, it has heretofore been difficult to prevent recontamination of the purifying material due to contact of the material with the walls of the furnace or other support. By eliminating the need for such contact, this source of contamination is eliminated.

FIG. 5 illustrates a method for forming a thin or sheet-like mass 60 using an apparatus 62 similar to the apparatus of FIGS. 1 and 4. The mass 60 is initially centrally positioned in the chamber 64 and established in a liquid state as by heating an initially solid mass. In order to form the sheet-like shape, only one transducer 18 is driven at a a considerable intensity to establish a standing wave pattern of large intensity. In directions perpendicular to the field established by transducer 18, there is no high intensity standing wave pattern. Accordingly, the mass 60 experiences a considerable pressure on the faces which face towards and directly away from the transducer 18, so that the mass tends to be pressed outwardly into a sheet-like form. The edges of the sheet-like form could be held away from the chamber walls by low intensity standing wave patterns. However, in the apparatus of FIG. 5, the transducers 16 and 20 are driven by high frequency oscillators 66, 68 that generate sound waves of a frequency at least ten times the lowest resonant frequency, so that there is normally no definite standing wave pattern established. However, the high frequency waves produce a pressure that tends to press away the edges of the sheet-like mass 60, particularly when the edge approaches close to the chamber walls. Additional transducers 16a, 20a and corresponding high frequency oscillators 68a, 66a are provided to create similar high frequency waves that generate small pressures to keep the other edges of the mass away from the other chamber walls. The sheet-like form, which may not be uniformly thick but rather is thicker at the center than near the edges, is useful in providing for more rapid cooling of the heated mass.

FIG. 6 illustrates an apparatus 70 constructed in accordance with another embodiment of the invention, which is utilized to move an object or mass 72 relative to the chamber, and in a controlled manner. The apparatus includes a moveable wall 74 which is mounted on bearings 76 that permit controlled movement of the wall towards and away from the opposite wall 78. Also, a transducer 80, which is used to establish a standing wave pattern that maintains the mass 72 between the walls 74, 78, is driven by a variable frequency oscillator 82 whose frequency is controlled by a control 84 that is, in turn, controlled by motion of the wall 74. The oscillator 82 is a voltage controlled oscillator, the control 84 is a rheostat whose wiper is electrically connected to the oscillator 82 to control its frequency, and a linkage 86 connects the wall 74 to the wiper of the rheostat control 84 to vary the voltage output in accordance with variation of wall position.

The apparatus of FIG. 6 is constructed so that as the wall 74 moves, the frequency of the transducer 80 is varied so that it is always resonant to the width dimension W of the chamber. The pressure node is maintained at the center of the chamber between the opposite walls 74, 78, and therefore the node moves by one-half the distance of movement of the moveable wall 74. The object 74 therefore also moves one-half the distance of the movement of the moveable wall. The other walls of the chamber are stationary and the other oscillators such as oscillator 90 can be driven at constant frequencies to maintain standing wave patterns.

FIGS. 7 and 8 illustrate the apparatus of FIG. 6 together with a heating apparatus 88 for performing a zone refining procedure on the mass 72a. The oscillator 82 is driven at a low intensity level while two orthogonal oscillators 90, 92 are driven at a high intensity level, to form the mass 72a into an elongated form. The wall 74 is then slowly moved while the frequency of the oscillator 82 is varied to maintain resonance so that the elongated mass also slowly moves. The heating apparatus 88 includes a current source 94 and a heating coil 96 energized therefrom and surrounding the elongated mass 72a. As the mass 72a moves, all portions thereof move through the heating coil 96, so that the mass is liquified in a slowly moving zone to purify the mass. The mass can be originally formed in an elongated solid shape by heating the entire mass to a liquid temperature and then allowing it to cool while in a field of the type illustrated in FIG. 4. Zone refining then can be accomplished in the manner described herein above.

FIG. 9 illustrates apparatus 10a similar to that of FIG. 1, but with one of the transducer 16 driven at twice the lowest resonant frequency of the chamber along the length dimension $L_1$. This produces a pressure distribution of the type illustrated in FIG. 10, wherein two pressure nodes are established on either side of the midpoint of the chamber between the walls 32, 34 thereof at the positions $\frac{1}{4}L_1$ and $\frac{3}{4}L_1$. Two objects 100, 102 can be maintained at the nodes. The other transducers 18 and 20 may be driven at the lowest resonant frequency so that only one node is established for each of these two transducers.

FIGS. 11 and 12 illustrate an apparatus 110 being utilized to grow crystals of ultra pure material. The apparatus utilizes the feature of a moveable wall described in connection with FIG. 6, and the feature of establishing two spaced nodes described in connection with FIG. 9. The apparatus includes a moveable wall 74a which operates a control 84a and an oscillator 82a, to vary the driving frequency of a transducer 80a. The control 84a is set to always control the oscillator so that the frequency of acoustic waves from the transducer 80a is always twice the lowest resonant frequency of the chamber in the direction between the walls 74a and opposite wall 78a. A mass 112 is established at one of the pressure nodes 114 within the chamber, while a holder 116 is established at the other node 118 within the chamber. The holder 116 holds a wire 119 which carries a seed 120 at its outer end. The wire 119 is just along enough so that the seed 120 contacts the mass 112.

While the mass 112 is maintained in a liquid state, the wall 74a is moved away from the other wall 78a, towards the position shown in FIG. 12. During the slow movement, the distance between the nodes, now at the positions 114a, 118a, increase so that the seed 120 is effectively pulled away from the mass 112. The movement is conducted slowly enough so that a crystal grows from the seed 120.

FIG. 12 illustrates an apparatus 130 which is utilized to rotate a suspended object 132. The apparatus includes a chamber of square cross section, so that the distance between one pair of walls 134, 136 is approximately the same as the distance between the other pair of walls 138, 140. The two transducers 142, 144 are driven at the same frequency, which is the lowest resonant frequency for the chamber, but a closely controlled phase relationship. A phase control circuit 146 controls the phases of two oscillators 148, 150 that drive the transducers 142, 144. The phase control circuit 146 controls the phases of the oscillators, to produce an acoustic torque. This is accomplished by constantly advancing the phase of one transducer with respect to the other, or in other words, driving the transducer at a slightly higher frequency. This causes gas in the chamber to move in an eliptical path, thereby causing the mass to rotate. The rapid rotation of the mass 132 is highly useful to remove trapped bubbles from the outer portion of a solidifying mass. If the mass 132 is a liquid that is solidifying under zero gravity conditions, gas bubbles tend to remain trapped in the mass rather than rising upwardly and escaping. By rapidly rotating the mass 132, centrifugal forces are created which urge the bubbles towards the center of the mass, so that the outer portion is free of trapped bubbles that could weaken the structure.

FIG. 14 illustrates an apparatus 160 which can induce rapid oscillations in a liquid mass 162, which is useful to agitate the mass to stir a molten mixture or for other purposes. The apparatus is similar to that of FIG. 1, except that the transducer 16 is driven from an oscillator 164 whose output passes through an amplitude control circuit 166 that can rapidly vary the amplitude of the signal delivered to the transducer. This results in a wave pattern whose acoustic pressure intensity varies in time, with a frequency determined by the amplitude control circuits, and which produces forces on the liquid mass which vary with this frequency. The liquid object 162 therefore is driven into oscillation at the modulating frequency. If this frequency coincides with a resonant oscillation of the liquid mass, the amplitude of the oscillations of the liquid will be quite large, and subsequent latent flaws in the liquid will result in stirring of the liquid. A constant standing wave pattern can be maintained in the other direction by transducer 168, or a similar oscillation mode of operation can be utilized thereat.

FIG. 15 illustrates an apparatus 170 which is different from the apparatus described earlier herein, in that the chamber 172 is in the form of a sphere to reduce the complexing of the apparatus. The spherical chamber 172 is constructed of a hard material such as glass, and is actually in the form of a thin layer extending on the surface of an imaginary sphere. A standing wave pattern is established within the sphere by a transducer 174 which actually vibrates the spherical shell chamber 172 rather than transmitting acoustic energy through openings in the chamber walls as is done in the apparatus in the FIGS. 1–15.

The transducer 174, which is driven by an oscillator 176, vibrates the chamber wall 172 so that the wall rapidly changes from the configuration illustrated in solid lines in 172 to the configuration shown at 172a, thereby establishing acoustical waves in gas 178 within the chamber. The chamber wall portions along imaginary line 177 and the orthogonal imaginary line 179 both vibrate, to produce standing wave patterns along orthogonal directions and at frequencies which are equal. In fact, standing wave patterns are established along all directions radiating from the center, except perhaps towards a plug 182. The oscillator 176 operates at a frequency equal to a resonant frequency of the chamber, such as the lowest resonant frequency wherein the wavelength equals twice the diameter of the chamber. The vibrating chamber establishes a standing wave pattern which is characterized by a pressure node (lowest pressure) at the center of the sphere and progressively increasing pressures at progressively greater distances from the center. As a result, an object 180 placed in the chamber tends to maintain a position at the center thereof. The pressure distribution is similar to that illustrated in FIG. 3, with the node being located at the center of the chamber. It should be noted that the pressure varies sinusoidally away from the center. This results in a large pressure variation with the distance, or pressure field, near the center of the chamber, but results in an almost zero pressure field or gradient near the spherical walls of the chamber. Thus, in order to support an object in this chamber, the object should be small compared to the diameter of the chamber, and is preferably of an average diameter less than half the diameter D of the chamber. The chamber is shown supported by a pair of legs 181 that are fastened to a stationary support, and the chamber has a removable plug 183 to permit the insertion and removal of objects. The apparatus of FIG. 16 is generally not as versatile as the apparatus of FIG. 1, but it can utilize a single transducer and is much simpler.

FIG. 16 illustrates an apparatus 170a similar to the apparatus of FIG. 15, but wherein the oscillator 176a is operated at twice the fundamental resonance frequency of the chamber 172. As a result of this frequency of operation, a pressure node, where the pressure is lowest, is established halfway between the center of the spherical chamber 172a and the walls thereof, this node being in the form of the surface of a sphere having a diameter half the diameter of the chamber 172a and concentric therewith. A molten mass 190 placed in the chamber tends to form itself into the shape of a hollow sphere of a diameter equal to half the diameter of the spherical chamber 172a. FIG. 18 illustrates the variation in pressure between the center point c and points at the walls of the chamber 172a, the nodes at positions ½R located halfway between the center of the chamber and its walls. A spherical pressure node is generated not only for a frequency equal to twice the fundamental freuqency, but for all other even harmonics of the fundamental frequency, such as four times the fundamental frequency. Normally, a frequency more than about four times the fundamental frequency is difficult to maintain as a precisely defined standing wave pattern, and it is very difficult to maintain a standing wave pattern at more than about ten times the fundamental frequency. It may be noted that for the fundamental frequency and for all odd harmonics or odd integral multiples (1, 3, etc.) thereof, a node exists at the center of the chamber.

Thus, the invention provides a method and apparatus for controlling the position of an object, and which also can be utilized to control the shape of a fluid object and to perform various procedures. Such control is accomplished by establishing a standing wave pattern of acoustic waves, a standing wave pattern generally being established in at least two orthogonal directions. Thus, in a chamber of rectangular cross-sections, two or three orthogonal transducers are utilized to generate two or three standing wave patterns, while in a spherical chamber a standing wave pattern is established which includes wave patterns that extend in all directions from the center of the sphere. The apparatus and method is especially useful under nominally zero gravity conditions. Under such conditions the apparatus and method can be used to prevent drift of objects or masses, the pressures established by the standing wave patterns being sufficient to prevent such drift or to produce slow movements under such gravity conditions.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A method for positioning an object comprising: establishing the object in a chamber of substantially square cross-section and of at least twice the object volume and that contains a fluid; and applying acoustic energy to the fluid from at least two orthogonal directions to establish standing wave patterns in the chamber along said orthogonal directions, so that the object tends to position itself at the intersection of pressure nodes of the wave patterns, the frequency along either of said orthogonal directions being no more than four times the fundamental resonant frequency whose half wavelength equals the chamber dimension along said direction;

said acoustic energy being applied in first and second modes which are of approximately the same frequency but in substantially perpendicular directions, the first and second modes being varied in relative phase to produce torques upon the object at the node.

2. A method for positioning a mass comprising: establishing the mass in a chamber having a first pair of spaced substantially parallel and substantially flat walls;

applying acoustic energy perpendicular to the first pair of walls at a frequency having a wavelength twice the separation distance of the walls to produce a standing wave pattern with a node location of minimum pressure spaced halfway between said pair of walls.

3. A method for positioning an object comprising: establishing the object in a spherical chamber that contains a fluid; and establishing vibrations in the fluid in at least two orthogonal directions at a wavelength equal to twice the diameter of the sphere, to establish a node of minimum pressure at the center of the sphere.

4. Apparatus for positioning a mass comprising: a chamber having a substantially rectangular cross-section, with a pair of spaced and substantially parallel first walls and a pair of spaced and substantially parallel second walls, and having chamber ends;

a first transducer coupled to the chamber at one of the first walls, to produce first sound waves in the chamber along a direction normal to the first walls;

a second transducer coupled to the chamber at one of the second walls, to produce second sound waves in the chamber along a direction normal to the second walls;

a first oscillator coupled to the first transducer for driving it at a frequency which is an integral multiple of the frequency whose wavelength in the chamber equals twice the separation of the first walls; and a second oscillator coupled to the second transducer for driving it at a frequency which is an integral multiple of the frequency whose wavelength in the chamber equals twice the separation of the second walls.

5. The apparatus described in claim 4 including: means for moveably mounting one of said first walls so it can move towards and away from the outer first wall; and means coupled to the first oscillator for varying the driving frequency so that it follows the change in separation of the first walls to remain an integral multiple of the separation of the first walls.

6. Apparatus for positioning a mass comprising: walls defining a substantially closed spherical chamber; and means coupled to the walls for establishing sound waves in the chamber at a wavelength equal to twice the diameter of the chamber and in substantially all radial directions with respect to the center of the chamber.

7. A method for positioning an object comprising: establishing the object in a chamber that contains a fluid and that has at least one moveable wall to permit varying of a chamber dimension;

applying acoustic energy to the fluid from at least two orthogonal directions at frequencies that establish standing wave patterns in the chamber along said orthogonal directions, so that the object tends to position itself at the intersection of pressure nodes of the wave pattern; and moving said moveable wall and varying the frequency of acoustic energy to maintain a standing wave pattern between the moveable wall and its opposite wall, as the chamber dimension varies.

8. A method for positioning an object comprising: establishing the object in a fluid state in a spherical chamber that contains a fluid; and applying acoustic energy to the fluid at an even integral multiple of a frequency whose wavelength equals the diameter of the sphere, to establish standing wave patterns in the chamber with a maximum pressure point at the center of the sphere and a node of minimum pressure spaced about the center, so that the fluid object forms a hollow sphere.

9. A method for positioning an object comprising: establishing the object in a chamber of substantially rectangular cross-section that contains a fluid, with a first pair of walls of the chamber extending substantially parallel to each other and perpendicular to a second set of walls, and with the separation of the first walls different than the separation of the second walls; and applying acoustic energy to the fluid in a first mode which is in a direction substantially perpendicular to the first pair of walls and at a frequency that is resonant to the separation distance of the first pair of walls, and in a second mode which is in a direction substantially perpendicular to the second pair of walls at a frequency that is resonant to the separation distance of the second walls.

10. A method for positioning a mass comprising: establishing the mass in a chamber having a first pair of spaced substantially parallel and substantially flat walls and having a second pair of spaced substantially parallel walls extending substantially perpendicular to the first walls, as seen in an imaginary cross-sectional view of the chamber;
maintaining the chamber under substantially zero gravity;
applying acoustic energy perpendicular to the first pair of walls at a frequency that produces a standing wave pattern with at least one node location of minimum pressure spaced from each wall of the first pair of walls;
applying acoustic energy perpendicular to the second pair of walls at a frequency that produces a second standing wave pattern with at least one node location of minimum pressure spaced from each wall of the second pair of walls;
establishing the mass in a liquid state; and
maintaining an acoustic pressure gradient, in a direction normal to the plane of said cross-sectional view at an intensity less than the pressure gradient near the nodes of said first named and second standing wave patterns, whereby to form an elongated narrow liquid mass.

11. A method for positioning a mass comprising:
establishing the mass in a liquid state in a chamber having a first pair of spaced substantially parallel and substantially flat walls;
maintaining the chamber under substantially zero gravity environment;
applying acoustic energy perpendicular to the first pair of walls at a frequency that produces a standing wave pattern with at least one node location of minimum pressure spaced from each wall of the first pair of walls; and
maintaining an acoustic pressure gradient, in first and second directions which are substantially normal to each other and to the first pair of walls, at an intensity less than the pressure gradient near the node of said standing wave pattern, whereby to form a sheet-like mass.

* * * * *